United States Patent
Kissner et al.

(10) Patent No.: US 9,460,300 B1
(45) Date of Patent: Oct. 4, 2016

(54) UTILIZING MULTIPLE ACCESS CONTROL OBJECTS TO MANAGE ACCESS CONTROL

(71) Applicants: Lea Kissner, Palo Alto, CA (US); Abhishek Parmar, San Jose, CA (US)

(72) Inventors: Lea Kissner, Palo Alto, CA (US); Abhishek Parmar, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 646 days.

(21) Appl. No.: 13/726,447

(22) Filed: Dec. 24, 2012

Related U.S. Application Data

(60) Provisional application No. 61/699,161, filed on Sep. 10, 2012.

(51) Int. Cl.
| | | |
|---|---|---|
| G06F 17/30 | (2006.01) | |
| G06F 21/60 | (2013.01) | |
| H04L 29/06 | (2006.01) | |

(52) U.S. Cl.
CPC ............ G06F 21/606 (2013.01); G06F 21/604 (2013.01); *G06F 2221/2141* (2013.01); *H04L 63/101* (2013.01)

(58) Field of Classification Search
CPC ............... G06F 2221/2141; G06F 2221/2154; G06F 21/604; H04L 63/101
See application file for complete search history.

(56) References Cited

U.S. PATENT DOCUMENTS

| | | | | |
|---|---|---|---|---|
| 5,878,415 A * | 3/1999 | Olds | ................... | G06F 21/6218 |
| 6,308,181 B1 * | 10/2001 | Jarvis | ................... | G06F 21/6227 707/786 |
| 7,865,545 B1 * | 1/2011 | Estrada | ............... | G06F 21/6218 709/201 |
| 2002/0129052 A1 * | 9/2002 | Glazer | ............... | G06F 17/30038 715/202 |
| 2005/0091518 A1 * | 4/2005 | Agarwal | ............... | G06F 21/6218 713/193 |
| 2007/0198545 A1 * | 8/2007 | Ge | ..................... | G06F 17/30327 |
| 2007/0233957 A1 * | 10/2007 | Lev-Ran | ............. | G06F 12/1458 711/118 |
| 2009/0228489 A1 * | 9/2009 | Hirai | ...................... | G06F 21/608 |
| 2009/0234841 A1 * | 9/2009 | Watanabe | ......... | G06F 17/30952 |
| 2009/0292814 A1 * | 11/2009 | Ting | ........................ | G06F 15/16 709/229 |
| 2011/0055902 A1 * | 3/2011 | Brodfuehrer | ......... | G06F 21/604 726/4 |
| 2011/0137947 A1 * | 6/2011 | Dawson | ................ | G06F 21/604 707/785 |
| 2011/0173679 A1 * | 7/2011 | Perumal | .............. | G06F 21/6218 726/4 |
| 2011/0302297 A1 * | 12/2011 | Kruglick | ............... | G06F 9/4856 709/224 |
| 2013/0142039 A1 * | 6/2013 | Bloch | ................. | H04L 47/2441 370/230 |
| 2013/0339406 A1 * | 12/2013 | Kanfi | ................ | G06F 17/30082 707/825 |
| 2014/0006355 A1 * | 1/2014 | Kirihata | ............ | G06F 17/30233 707/654 |

* cited by examiner

*Primary Examiner* — Eleni Shiferaw
*Assistant Examiner* — Gregory M Elmore
(74) *Attorney, Agent, or Firm* — Procopio, Cory, Hargreaves & Savitch, LLP

(57) ABSTRACT

Access control systems and methods are described, including receiving a request from a user to access a first object, where first access-control information is associated with the first object; determining that the first object is referenced by a second object; determining second access-control information associated with the second object, where the second access-control information identifies the user as having access to the second object; and providing to the user access to the first object based on to the second access-control information.

20 Claims, 8 Drawing Sheets

UTILIZING MULTIPLE ACCESS CONTROL OBJECTS TO MANAGE ACCESS CONTROL

CROSS-REFERENCE TO RELATED APPLICATIONS

This application claims the benefit of U.S. provisional app. Ser. No. 61/699,161, filed Sep. 10, 2012, entitled ACCESS CONTROL SYSTEMS AND METHODS, which is hereby incorporated by reference.

BACKGROUND

Objects (e.g., photos, videos, documents, files, group of codes, etc.) in a data processing system are often designed for more than one user to access. Typically, access to objects is controlled by an access control list (ACL). The ACL identifies the users and types of access given to an object. To allow different users to access the object, the ACL that controls access to the object needs to be changed accordingly. For example, if Charlie does not have access to an object (e.g., an image) and needs to be given access to the object, the ACL that controls access to the object needs to be changed to include Charlie.

If a single access involves accessing two or more objects, ACLs that control access to these objects need to be changed to reflect the correct access permissions. For example, if a photo object (e.g., an image) is embedded or attached to an email (or a document, a webpage, etc.), the ACLs that control access to both the photo object and the email need to be changed to reflect that those users who have access to the email far also given access to the photo.

SUMMARY

The subject matter discussed herein relates generally to data processing and, more particularly, to access control systems and methods. The subject matter discussed herein may provide advantages. For example, access control information is context sensitive based on the wish or intent of the user granting access. Access control information does not need to be changed and/or managed for multiple combinations of access permissions. Access control information may be implemented as a central system or distributed systems.

The subject matter includes a method for receiving a request from a user to access a first object, where first access-control information is associated with the first object; determining that the first object is referenced by a second object; determining second access-control information associated with the second object, where the second access-control information identifies the user as having access to the second object; and providing to the user access to the first object based on to the second access-control information.

In some implementations, the first access-control information is stored in a first access control object associated with the first object, the second access-control information is stored in a second access control object associated with the second object, and a third access control object may be created that includes the first access-control information and the second-access-control information.

In some implementations, the first access-control information is stored in an access control object associated with the first object, and the access control object may be modified to include the second access-control information associated with the second object.

In some implementations, the first access-control information does not identify the user as having access to the first object.

In some implementations, the second access-control information is contained in two or more access control lists formed in a linked list and the user having access to the second object is found traversing through the access control lists.

In some implementations, there may be two or more versions of an object and two or more versions of the associated access-control information. The correct access-control information is determined based on the version of the associated object. In some situations, the correct access-control information is the last version of access-control information.

In some implementations, the second object identifies or references the first object (e.g., by embedding or providing a link to the first object). The first object may be an image, a video, a document, an audio, an email message, a file, or the like.

In addition to a method as described above, the implementations may include a system or a computer-readable medium, but are not limited thereto.

DETAILED DESCRIPTION

The subject matter described herein is taught by way of example implementations. Various details have been omitted for the sake of clarity and to avoid obscuring the subject matter. The examples shown below are directed to structures and functions for implementing access control systems and methods.

Controlling access to objects (e.g., photos, videos, emails, documents, files, group of codes, web postings, etc.) may be allowed and/or restricted based on context. For example, a user Bob may own or have the authority to grand access to an image and a post on a social network that shares the images. As an illustration, Bob wants to share an image on a social network. At the moment of sharing, one or more of the users with whom (e.g., the recipients) Bob wants to share the image may not have access to the images. For example, access to the image may be controlled using access control information (e.g., an access control list or ACL which indicates who is allowed to access the image and Bob has not granted access to these users in the ACL). The access control information may not allow every user in Bob's recipient list to access the image.

Bob may share the image by creating a post, in which Bob embeds or attaches the image or includes a link to the image (e.g., the image is referred to or referenced by the post). Access to the post and content of the post (e.g., including the image) may be controlled based on the recipients of the post (e.g., access is given to the recipients of the post). For example, since Bob creates the post, Bob may be considered as the owner of the post or given the authority to control access to the post (e.g., in an ACL associated with the post).

Based on the context of the post, access to the image may be automatically granted to the recipients of the post regardless of, and, in some implementations, without changing, the access control information that controls access to the image. In this example, Bob includes Alice as a recipient of the post, which is used to share the image. This context shows that Bob has intended for Alice to have access to the image. Therefore, regardless of whether Alice has access to the image based on the access control information (e.g., an ACL) associated with the image, Alice, as a recipient of the post, is allowed to access to all the content of the post, including the image. Bob does not have to change the ACL associated with the images to grant Alice access to the image via the post.

Figure 1:
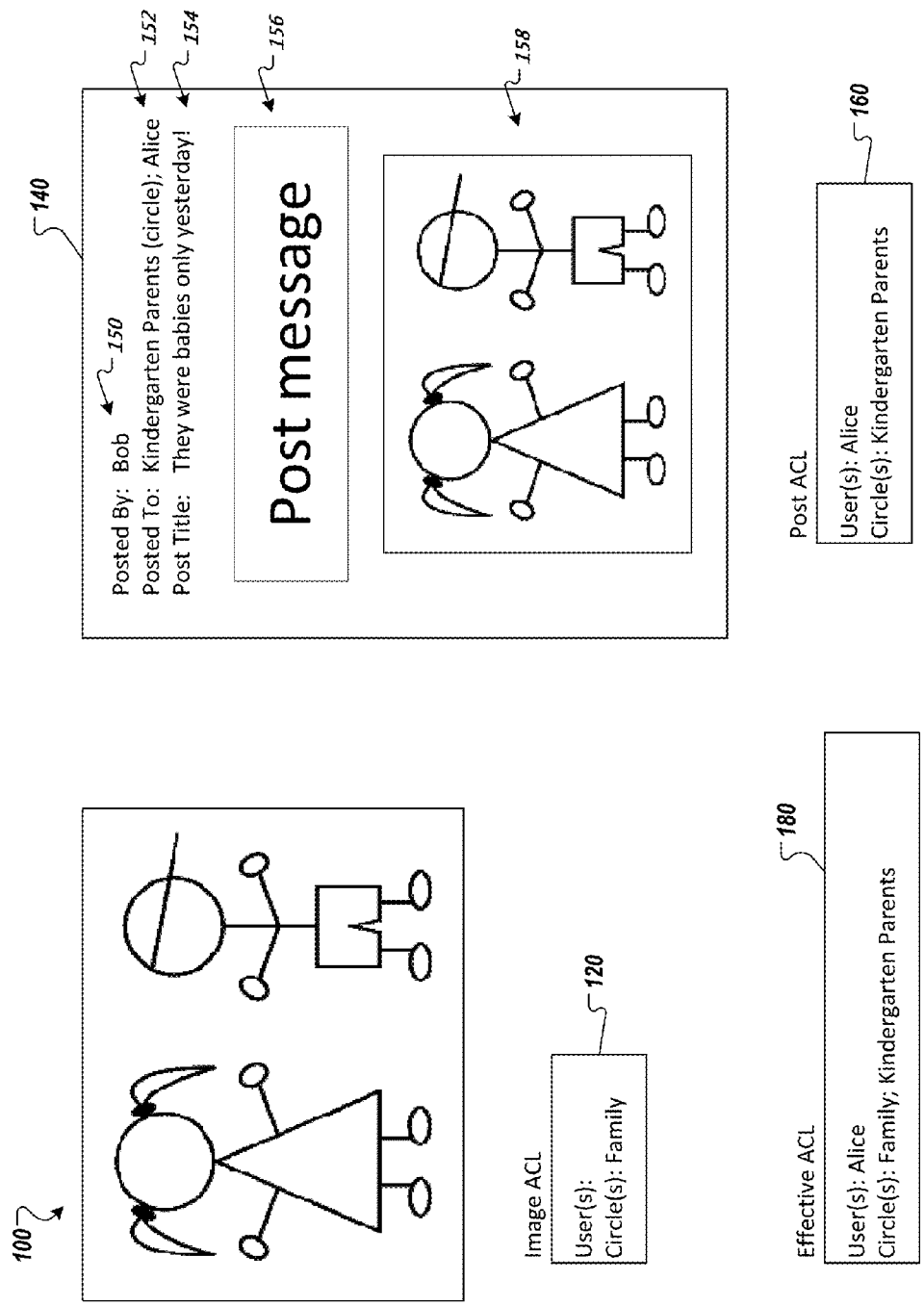
FIG. 1 shows an example implementation of access control.

FIG. 1 shows an example implementation of access control. For illustration, there may be an image object 100 (or image 100) and an image ACL object 120 (or image ACL object 120). The ACL object 120 is associated with the image 100. There may be a post object 140 (or post 140) and a post ACL object 160 (or post ACL 160). The ACL object 160 is associated with the post 140.

Post object 140 may be a post created by a user (e.g., Bob). For example, Bob wants to share image 100 with users, such as those on an email network or a social network. Bob may create post 140 to share that image 100. Post 140 may include the author 150 (e.g., Bob). Bob may provide information of one or more recipients 152; additional information, such as a title or subject line 154; and a message 156. Recipients 152 may be identified in any manner, such as using email addresses and/or user identifiers (e.g., users in Bob's "Kindergarten Parents" circle and another user "Alice"). Recipients 152 identifies the recipients Bob wants to share post 140 with. To share image 100 in post 140, Bob may embed or attach image 100 to post 140 (e.g., post 140 references image 100 or the content of post 140 includes or identifies image 100). Image 100 shared in post 140 is shown as image 158.

When Bob creates post 140, ACL object 160 may be created (e.g., automatically created) based on recipients 152. ACL object 160 controls access to post 140. For example, ACL object 160 includes information that indicates a user "Alice" and a circle "Kindergarten Parents" (e.g., users in that circle) are allowed access to post 140.

The image 100 that is being shared in post 140 (e.g., as an image or a link 158) may have an associated ACL (e.g., ACL object 120). For example, ACL object 120 may indicates that Bob's "Family" circle of users are allowed access to image 100.

Although ACL object 120 does not indicate that user "Alice" or users in circle "Kindergarten Parents" are allowed access to image 100, in the context of post 140, access to image 100 (as image or link 158 within post 140) may be derived from one or more ACLs (e.g., ACL object 160) associated with post 140.

In the context of post 140, image 100 (as image or link 158 within post 140) may have an effective ACL 180. Effective ACL 180 may include the access control information (e.g., ACL object 160) associated with post 140 and the access control information (e.g., ACL object 120) associated with image 100. In this example, effective ACL 180 is a union of ACLs 120 and 160.

In some implementations, effective ACL 180 may be formed differently, such as formed with access control information that is an intersection of two or more ACLs (e.g., effective ACL 180 allows access by users included in both ACLs object 120 and 160). Other ways of forming effective ACLs may be using any combination of operators (e.g., set operators in mathematics).

Effective ACL 180 may be referred to as a context-sensitive ACL. Effective ACL 180 may be associated with any object or any type of object (e.g., a post, audio, video, image, document, text, webpage, etc.). In the example of FIG. 1, effective ACL 180 is associated with an image (image 100).

Effective ACL 180 may be conceptual (e.g., not as an ACL object). For example, when a user accesses image or link 158 through post 140, ACL object 160 and ACL object 120 may be consulted to determine whether the access is allowed (e.g., whether the accessing user is included in the ACL object 160 or ACL object 120).

In some implementations, effective ACL 180 may be created as an ACL object 180 separate from ACL object 160 and ACL object 120. When a user accesses image or link 158 through post 140, ACL object 180 may be consulted to determine whether the access is allowed (e.g., whether the accessing user is included in ACL object 180).

Is some implementations, the content of ACL object 120 or ACL object 160 may be replaced by the content shown in effective ACL 180. When a user accesses image or link 158 through post 140, ACL object 120, after its content replaced, may be consulted to determine whether the access is allowed (e.g., whether the accessing user is included in ACL object 120).

ACL objects (e.g., ACL object 160, ACL object 120, ACL object 180, etc.) including any effective ACLs may be stored separately from the objects they are associated with (e.g., post 140, image 100, etc.). In some implementations, ACL objects maybe stored in a centralized system. In other example implementations, ACL objects may be distributed to different parts of one or more data processing systems.

As used herein, the term "object" refers to any collection of electronic content (e.g., data, codes, and/or other content), the access of which can be or is desired to be controlled. Examples of objects may be, but are not limited to, a document, image, audio, video, a file, a directory, a database, a communication session, a communication line, a group of codes or scripts, an object as referred to in any object-oriented programming language (e.g., Java, C++, etc.), any part thereof, or any combination thereof. An object can be any conceptual grouping of electronic content, including one or more other objects, one or more portions of one or more other object, or any combination of electronic content and other objects. An object can be any information or collection of information the access of which can be or is desired to be controlled. For example, an object may be the "geographic data leased from company A," information about the "sales clerks and people who can see what they are doing at company B," the "people with webmaster permissions at company C," users with "the ability to hit the reset button on a virtual machine," or any other arbitrary information or data. Access control information may be stored in objects (e.g., ACL objects).

As used herein, the term "account" or "online account" refers to a product, service, or application associated with a user. A user may have, subscribe to, and/or use one or more accounts or online accounts (e.g., a user may have an email account, a social network account, a photo sharing account, a video sharing account, an online storage account, a mobile account, a blog account, etc.).

An account can be an internet or external account (e.g., an end user subscribing to an openly, publicly, or semi-publicly available service), an intranet or internal account (e.g., an employee subscribing to a service of a company or firm), an extranet or controlled availability account (e.g., an account available to vendors, customers, or other controlled subscribers), or another type of account.

As used herein, the term "product" or "service" or "application" refers to any information, data, communication, infrastructure, organization, service, assistance, entertainment, or the like provided by one or more providers via online communication to at least one user. Examples of products, services, or applications may include, but are not limited to, online searching, e-commerce services, maps, locational data, dating services, online forums, online platforms, bulletin boards, social networks, websites, sites, chat rooms, email communication, image or photo sharing sites, video sharing sites, audio sharing sites, data sharing platforms, data storage, software, tax preparation and filing, gaming, mobile applications, news, translation, toolbar, calendar, instant messaging, short message service, voice, phone, video communication service, and the like. Products, services, or applications may be provided on any platform or device ranging from a mobile device (e.g., smartphone), to a semi-mobile device (e.g., a laptop), and to a non-mobile device (e.g., a kiosk, television, computer, etc.). A product, service, or application may communicate to a provider or another product, service, or application using a wired or wireless connection.

As used herein, the term "website" or "site" refers to a set of web pages for providing or supporting related services. A website can be hosted on at least one computing device (e.g., a system, server, web server, application server, client, or any label) accessible via a network or connection (wired and/or wireless). A website can be accessed and/or supported using at least one top-level Uniform Resource Locator (URL, e.g., "abc.gov," "123.org," "zxc.com," "bestads.com," "virtualbank.com," and the like). A website can be operated and/or supported by one or more business entities. For example, ZXC Corporation may operate the website "zxc.com" that includes web pages, content, and/or services from "zxc.bestads.com" (e.g., advertisement services provided by another firm) and "virtualbank.com/zxc-payment-services" (e.g., financial services provided by a financial institution).

Figure 2:
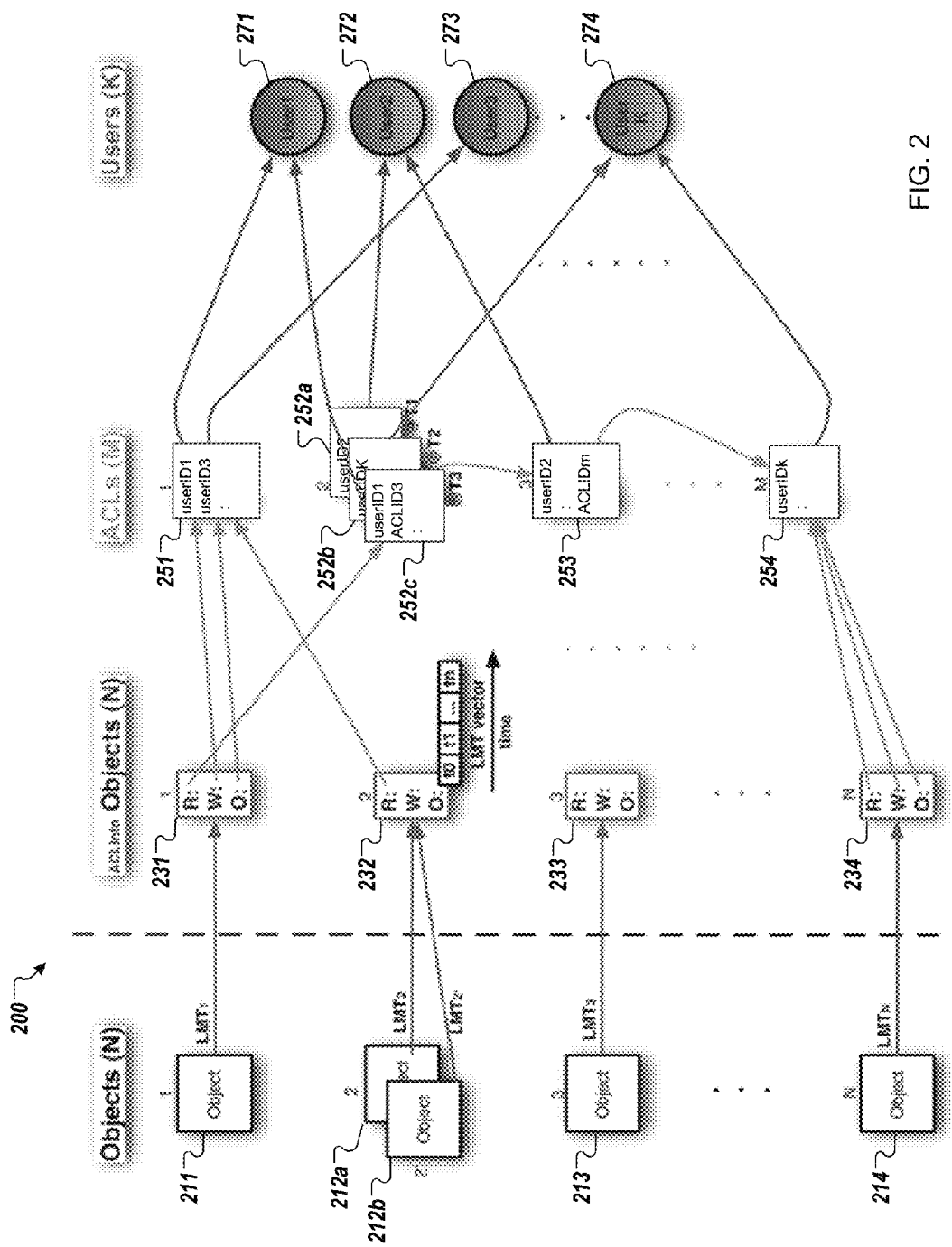
FIG. 2 shows an example access control system according to some example implementations.

FIG. 2 shows an example access control system according to some example implementations. Access control system 200 includes, for example, objects 211-214, ACL objects 231-234 (e.g., "ACLInfo Objects"), ACLs 251-254, and users 271-274 (e.g., user identifiers or user information). Objects 211-214 may include objects 110 and 140 (FIG. 1).

ACL objects 231-234 may include ACL objects 120, 160, and 180 (e.g., where effective ACL 180 is implemented as an ACL object). In some implementations, one or more ACL objects 231-234 may contain one or more ACLs, such as user information (e.g., "Alice") and/or indirect user information (e.g., "Kindergarten Parents" circle, which in turn may contain user information and/or other circles, etc.). In some implementations, one or more ACL objects 231-234 may contain one or more pointers to ACLs (e.g., ACLs 251-254). In some implementations, one or more ACL objects 231-234 may contain a combination of one or more ACLs and pointers to ACLs.

ACL 251-254 may be actual ACLs and/or effective ACLs (e.g., effective ACL 180). An ACL may contain user information (e.g., "Alice), indirect user information (e.g., "Kindergarten Parents" circle, which in turn may contain user information and/or other circles, etc.) and/or one or more pointers to other ACLs.

In the example shown in FIG. 2, objects 211-214 and ACL objects 231-234 may be implemented one to one (e.g., for every unique object 211-214, there exists a corresponding ACL object 231-234, such that there are N objects to N ACL objects). The number of ACL objects to ACLs may be N to M, and there may be K users. N, M, and K can be any numbers.

As examples, object 211 is associated with ACL object 231. Object 211 may have an associated timestamp (e.g., last modified timestamp or LTM) that indicates when it was last modified or created. An ACL objects may include information for controlling different types of access, such as read access (R), write/update access (W), and owner or owner access (O). Other types of access may be implemented. Here, ACL object 231 is implemented with "O, R, and W" access types. "R" of ACL object 231 is illustrated with a pointer or link to ACL 252c, which includes information (e.g., identifier) of user 271 and a pointer or link to ACL 253. ACL 253 includes information of user 272 and a pointer or link to ACL 254, which includes information of user 274. In effects, users 271, 272, and 274 have read access to object 211.

Both "W" and "O" of ACL object 231 point to ACL 251, which includes information of users 271 and 273. Users 271 and 273 have write/update access as well as owner access to object 211.

In some implementations, an ACL may be implemented with version control. ACL 252 is shown with three versions. At time T1, version ACL 252a contains information of user 272. Version 252b at time T2 contains information of user 274. Version 252c at time T3, the current or last version shown, contains information of user 271 and a pointer or link to ACL 253.

In some implementations, an object may be implemented with version control. Object 212 is shown with two versions, 212a with $LMT_2$ and 212b with $LMT_{2'}$. One version (e.g., 212b) is newer than the other version (e.g., 212a). Object 212 is shown associated with ACL object 232.

In some implementations, an ACL object may be implemented with version control. For example, ACL object 232 is shown being versioned. ACL object 232 may be created initially at time t0. Content of ACL object 232 may be changed at time t1, t2, . . . and at time tn. At time tn, the "R" access of ACL object 232 may point to ACL 251. At other times on the LTM vector or time line, the "R," "W," and/or "O" access of ACL object 232 may be different then what is shown at time tn.

Figures 3A, 3B:
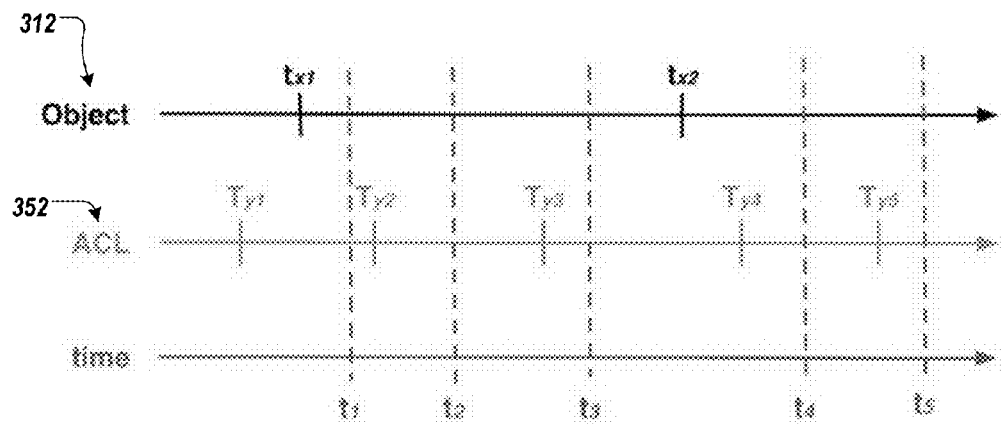
FIGS. 3A-B show example access control features of some example implementations.

FIGS. 3A-B show example access control features of some example implementations. Version control of objects, ACL objects, and or ACLs may be implemented to provide access control of objects using correct version of ACLs and/or ACL objects. For example, when providing access to any version of an object, the latest version of an ACL applicable to that version of the object may be used.

FIG. 3A shows a versioning example of an object and a corresponding ACL. Object 312 may have gone through two versions at times tx1 and tx2 (e.g., the tx1 version and tx2 version of object 312). Access to object 312 may be controlled by ACL 352 that went through five versions at times Ty1, Ty2, Ty3, Ty4, and Ty5. Object 312 and ACL 352 are shown on a timeline with times t1, t2, t3, t4, and t5.

FIG. 3B shows a matrix that indicates the correct ACL version to use for the two object versions tx1 and tx2 at various points in time (e.g., t1, t2, t3, t4, and t5). To control access to the tx1 version of object 312, the Ty1 version of the ACL should be used at time t1, Ty2 version at time t2, Ty3 version at time t3 and after. To control access to the tx2 version of object 312, which does not exist before time t3, the Ty4 version of the ACL should be used at time t4 and Ty5 version at time t5.

In some implementations, the timestamp (e.g., last modified timestamp, or LMT) of an ACL or the associated object may be used as a version indicator of the associated object contents as well as the object ACLs. For example, at time T1 (not shown), Alice shares post P with her "Friends" circle, and Bob is not in Alice's "Friends" circle and is not receiving P as a separate user. Version 1 of P (P.v1) and the associated ACL object (ACL.v1) may be created based on the LMT of the P at T1. Alice then updates post P at time T2 (not shown) (e.g., adding something Alice believes Bob may want to see) and adds Bob to her "Friends" circle, or as a user in addition to the "Friends" circle who is allowed to access post P. Version 2 of P (P.v2) and the associated ACL object (ACL.v2), which includes Bob, may be created based on the LMT of the P at T2. Alice's intent is to use ACL.v1 with P.v1 and use ACL.v2 with P.v2.

In some implementations, an ACL object may be create for each combination of object version and ACL version. In some implementations, as in the example of ACL object 231 (FIG. 2), an ACL object may point to correct version of the ACL, such as the latest version or a correct version as shown in FIG. 3B.

Figure 4:
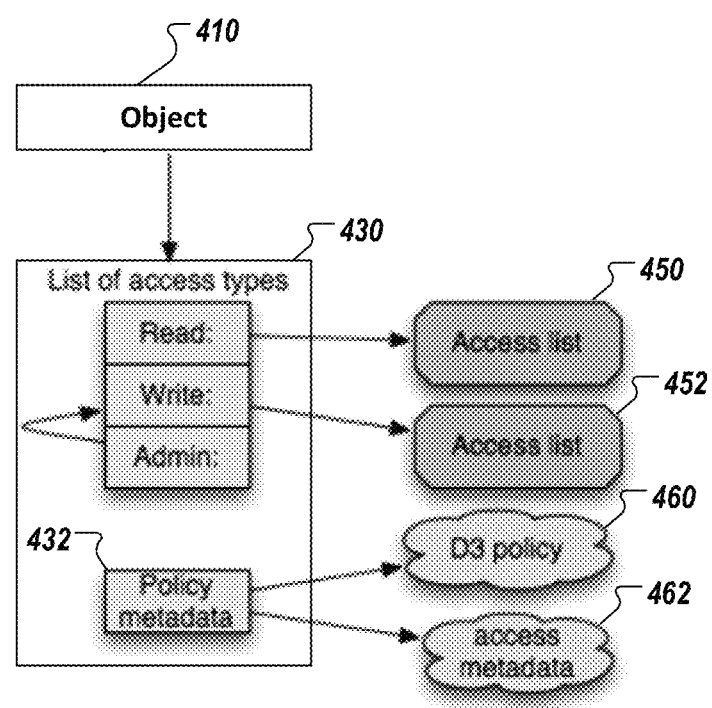
FIG. 4 shows an example object and an associated ACL object.

FIG. 4 shows an example object 410 and an associated ACL object 430. ACL object 430 include information for one or more access types (e.g., "Read," "Write," and "Admin"). In this example, ACL object 430 include policy/metadata 432. ACL object 430 may point to ACL 450 for read access and point to ACL 452 for write access. Admin access may be the same as write access as indicated by an arrow pointing to write access. Policy/metadata 432 may point to one or more policies and/or metadata source, such as policy 460 and metadata 462.

Figure 5A:
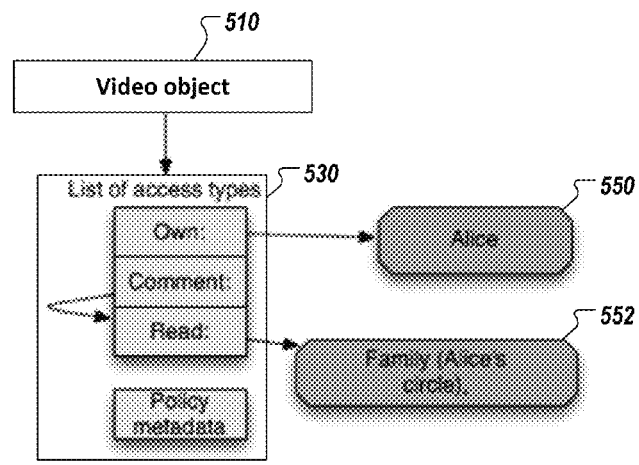
FIGS. 5A-B show example implementations of access control features.
Figure 5B:
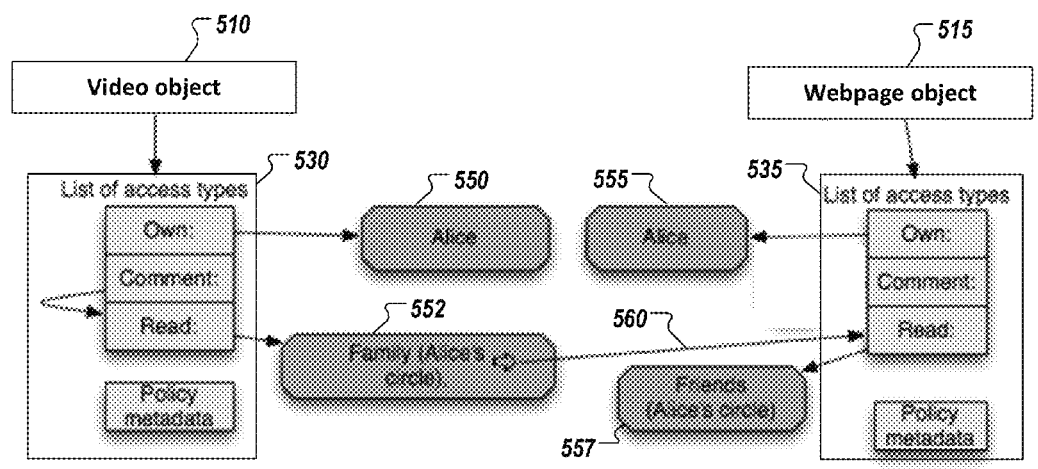

FIGS. 5A-B show example implementations of access control features. Examples features are illustrated using media content (e.g., a video) and a container (e.g., a webpage or post on a social network) for sharing the video.

FIG. 5A shows that, for example, a user Alice uploads a video on a video sharing site. The video may be referred to or stored as a video object 510. The video sharing site may be associated with a social network (e.g., the video sharing site may have a business and/or technical connection with the social network or both are owned and/or operated by the same business entity). Alice indicates that her "Family" circle may view or read the video.

The video sharing site may create an ACL object 530 for controlling access to video object 510 (e.g., ACL object 530 is associated with video object 510). ACL object 530 include information for one or more access types (e.g., "Own," "Comment," and "Read"). A link from access type "Own" to ACL 550 indicates that Alice has owner access privilege. In some implementations, users with read or view access may be allowed to provide comments (as shown with the arrow pointing from "Comment" to "Read" access). The "Read" access type includes a pointer to ACL 552, which indicates that a "Family" circle of users are allowed to read or view video object 510.

FIG. 5B shows that Alice creates a post (e.g., on a social network) to share video object 510. The post may be created as a webpage object 515 by the service provider of the social network. Alice may embed the video or include a link to the video. Alice wants to share the video object 510 in the webpage object 515 with her "Friends" circle. An ACL object 535 may be created (e.g., by and/or at the social network) to control access to the webpage object 515. The "Own" access type of ACL object 535 points to an ACL 555 with Alice's user information to indicate that Alice is the owner of the post. Alice does not indicate who is allowed to comment on webpage object 515 and commenting is not allowed by default. The "Comment" access type is left blank or may point to an empty field or list. The "Read" access type points to an ACL 557 with Alice's "Family" circle to indicate that her "Friend" circle of users are allowed access (e.g., viewing) of webpage object 515.

Note that ACL object 530, which is associated with video object 510 and used to control access to video object 510, does not allowed access to Alice's "Friends" circle. To implement Alice's wish or intent, which is allowing users who can view or read webpage object 515 (e.g., those in the "Friends" circle) to also view or read video 510 shared in webpage object 515, an effective ACL may be implemented. One example implementation of an effective ACL is adding a link 560 from the video's "Read" access ACL 552 to the post's "Read" access type, which is linked to Alice's "Family" circle in ACL 557. With a path from the video's "Read" access type to Alice's "Friends" circle, members of Alice's "Friends" circle are allowed access to video object 510.

In some implementations, ACL object 530 may be changed to include link 560 (e.g., changing ACL 552, which is part of ACL object 530, to include link 560). In some implementations, link 560 may be recorded (e.g., in a link table) without changing ACL object 530 or ACL 552. Anytime an ACL (e.g., ACL 552) is consulted, the link table is check to see if any link from the ACL exists. If it does, the link is followed.

Another example of an effective ACL may be creating an ACL object (not shown) that includes the union of the ACL objects 530 and 560 but is separate and in addition to ACL objects 530 and 560. For example, the Effective ACL object would look the same as ACL object 530 with a link to add from ACL 552 to ACL 557.

When a member of Alice's "Friends" circle (e.g., Bob) attempts to access (e.g., view) video object 510 through webpage object 515, ACL object 535 is checked to see if Bob is allowed to access the webpage object 515, which he is. When Bob attempts to view video object 510, ACL object 530 is checked and determines that, as a results of link 560, Bob is allowed to view (e.g., read) the video as intended by Alice.

Figure 6:
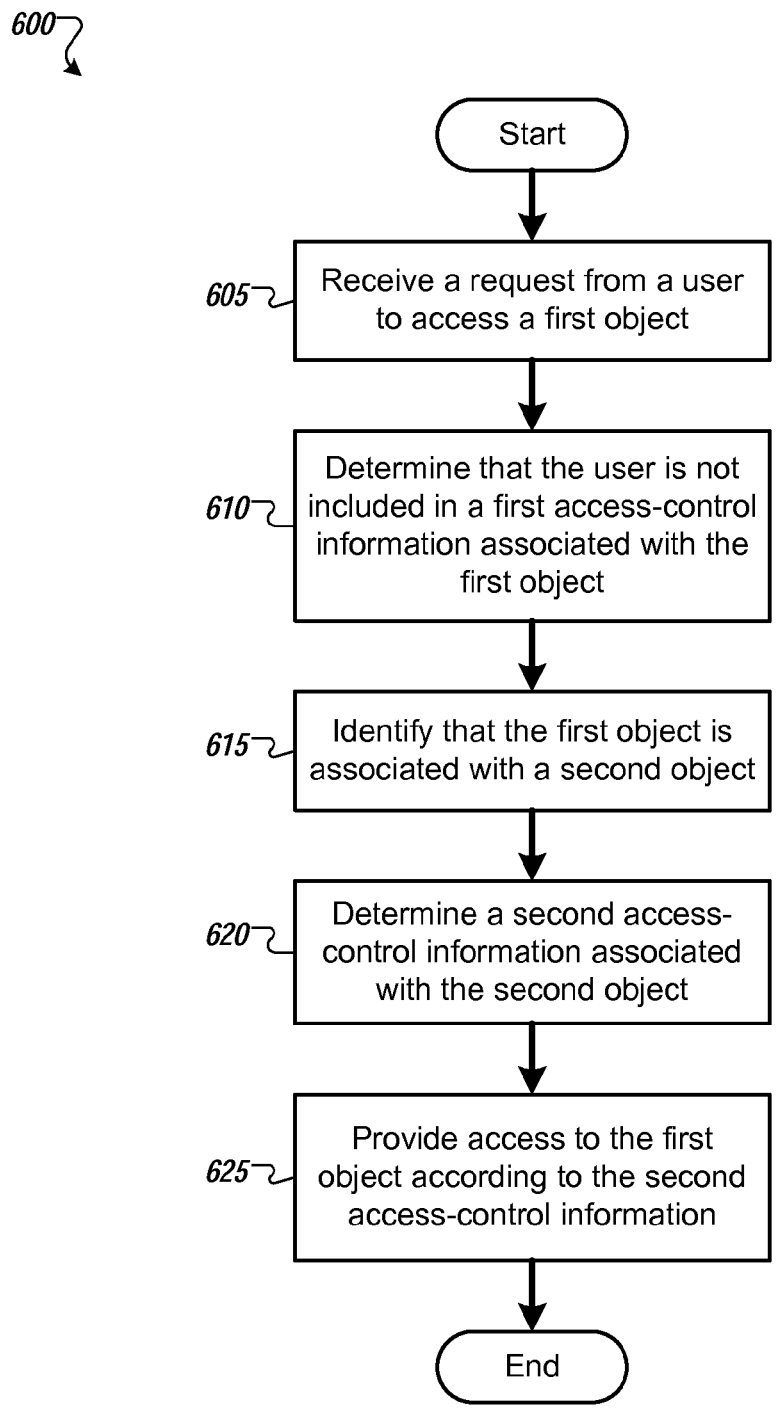
FIG. 6 shows an example of a process implementation.

FIG. 6 shows an example of a process implementation. Process 600 may start at block 605 where a request from a user to access a first object is received. The first object may be, for example, an image, video, audio, document, file, or the like. The first object may be any content in any format. At block 610, a first access-control information is determined associated with the first object. The first access-control information may be an ACL and/or contained in an ACL object. The first access-control information identifies at least one user who is allowed access to the first object and does not identify that the user making the request is allowed access to the first object.

At block 615, it is identified or determined that a second object is associated with the first object. The second object may be, for example, an email, a webpage, or a post on a social network. The second object may share or reference the first object (e.g., the first object being presented, provided, contained, embedded, or included as a link). At block 620, a second access-control information is determined associated with the second object. The second access-control information may be an ACL and/or contained in an ACL object. The second access-control information identifies one or more users who are allowed access to the second object. At block 625, access to the first object is provided according to or based on the second access-control information.

For example, if the one or more users in the second access-control information include the user making the access request, the user is allowed to access the first object. If the one or more users in the second access-control information do not include the user making the access request, the user is not allowed to access the first object. If the user is denied access to the first object, an error message, reason for the denial, and/or status code may be returned or provided.

In some examples, process 600 may be implemented with different, fewer, or more blocks. Process 600 may be implemented as computer executable instructions, which can be stored on a medium, loaded onto one or more processors of one or more computing devices, and executed as a computer-implemented method.

Figure 7:
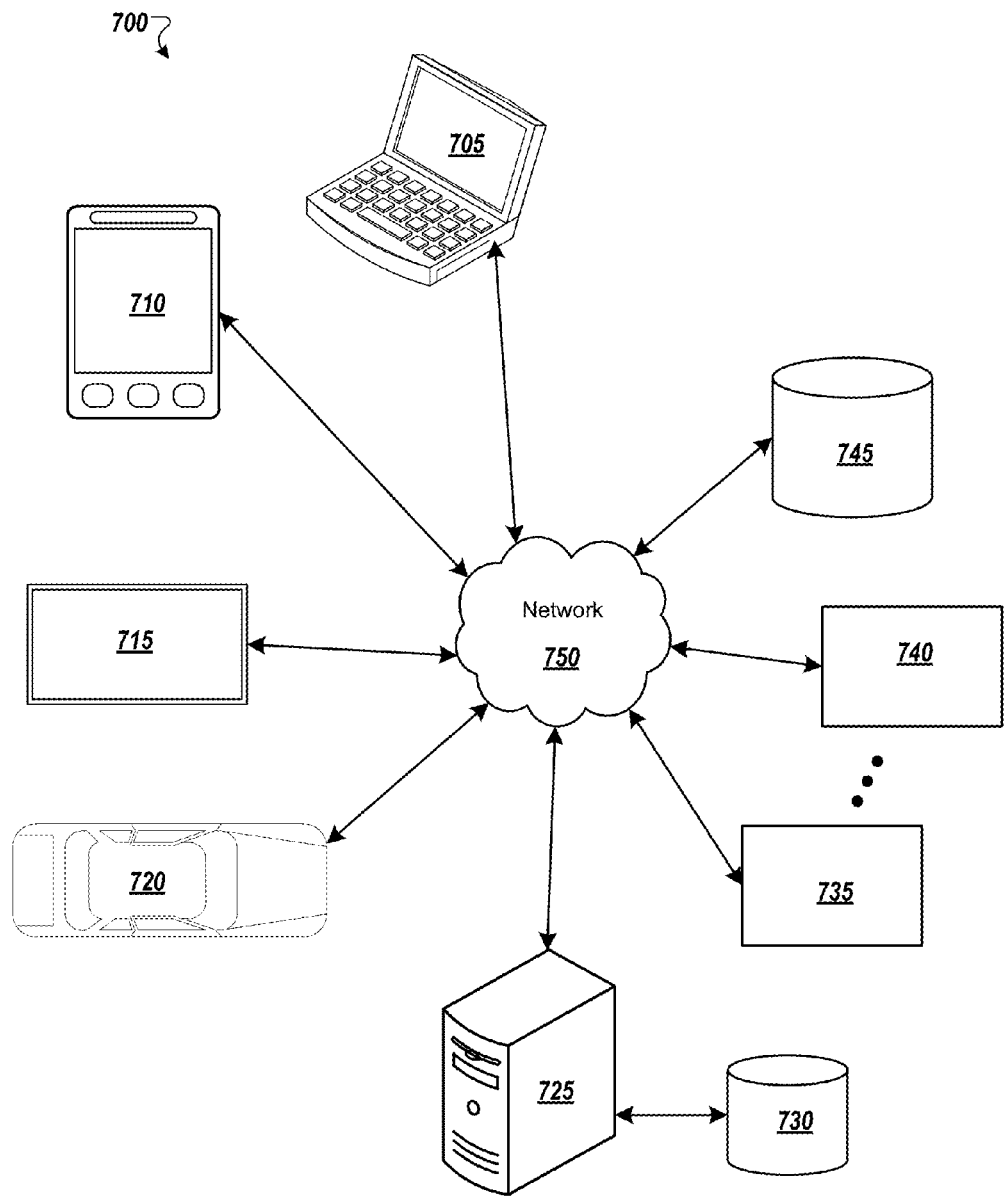
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing device 805 described below in FIG. 8. Devices 705-745 may include, but are not limited to, a computer 705 (e.g., a laptop computing device), a mobile device 710 (e.g., smartphone or tablet), a television 715 with one or more processors embedded therein and/or coupled thereto, a device associated with a vehicle 720, a server computer 725, computing devices 735-740, storage devices 730 and 745.

In some implementations, devices 705-720 may be considered user devices (e.g., devices used by users to access services and/or issue requests, such as on a social network). Devices 725-745 may be devices associated with service providers (e.g., used by service providers to provide services and/or store data, such as webpages, text, text portions, images, image portions, audios, audio segments, videos, video segments, and/or information thereabout).

For example, a user (e.g., Alice) may access, view, and/or share a video embedded in a webpage using user device 705 or 710 on a social network supported by one or more devices 725-745. A recipient (e.g., Bob) may access and/or view Alice's shared content using device 715 or 720.

Figure 8:
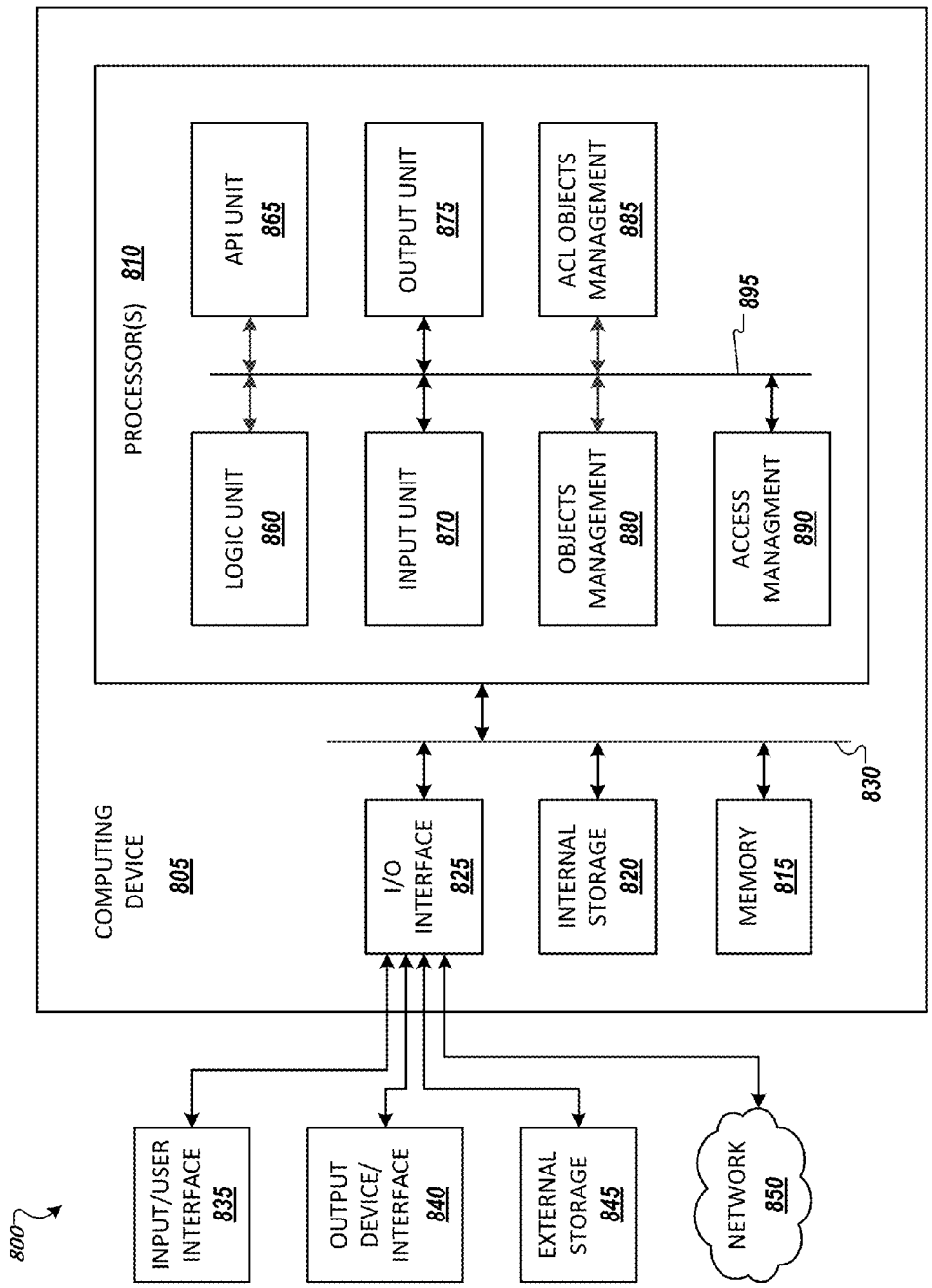
FIG. 8 shows an example computing environment with an example computing device suitable for use in some example implementations.

FIG. 8 shows an example computing environment with an example computing device suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, ACL objects management unit 880, ACL management unit 885, access management unit 890, and inter-unit communication mechanism 895 for the different units to communicate with each other, with the OS, and with other applications (not shown). For example, ACL objects management unit 880, ACL management unit 885, and access management unit 890 may implement one or more processes shown in FIG. 6. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, ACL objects management unit 880, ACL management unit 885, and access management unit 890). For example, input unit 870 receives a video and, via API unit 865, communicates with ACL objects management unit 880 to create an ACL object for the video. ACL objects management unit 880 interacts with ACL management unit 885 to create one or more ACLs for use with the newly created ACL object for the controlling access to the video. When an access to the video is received, e.g., by input unit 870, the access requests may be passed to access management unit 890 to determine, using one or more associated ACL objects, whether access to the video is granted.

In some instances, logic unit 860 may be configured to control the information flow among the units and direct the services provided by API unit 865, input unit 870, output unit 875, ACL objects management unit 880, ACL management unit 885, and access management unit 890 in some example implementations described above. For example, the flow of one or more processes or implementations may be controlled by logic unit 860 alone or in conjunction with API unit 865.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method of providing access for an online social network having one or more users that belong to an online social circle of the online social network, the computer-implemented method comprising:

receiving a request from a user to access a first object, where first access-control information is associated with the first object by a first access-control object that defines one or more access types defined for the first object, and provides a first pointer to a first access-control list for each of the one or more access types of the first object;

determining that the first object is referenced by a second object;

determining second access-control information associated with the second object, by a second access-control object that defines one or more access types of the second object, and provides a second pointer to a second access-control list for each of the one or more access types defined for the second object, the second access-control information identifying the user as having access to the second object; and the first access-control object generating a link from the first access-control list to the second access-control object, without changing the second access-control object, so as to provide the user with access to the first object based on to the second access-control information, wherein a link table including the link is checked to determine that the link is established for the second access-control object.

2. The method of claim 1, wherein the first access-control information is stored in the first access control object associated with the first object, the second access-control information is stored in the second access control object associated with the second object, and the method further comprises creating a third access control object that includes the first access-control information and the second access-control information, with the link from the first access-control list to the second access-control object.

3. The method of claim 1, wherein the first access-control information is stored in the first access control object associated with the first object, and the method further comprises modifying the first access control object to include the second access-control information associated with the second object.

4. The method of claim 1, wherein the first access-control information does not identify the user as being allowed to access the first object.

5. The method of claim 1, wherein the second access-control information is contained in a plurality of access control lists formed in a linked list and the user is found in one of the plurality of access control lists.

6. The method of claim 1, further comprising a plurality of versions of the second object and a plurality of versions of the second access-control information, wherein the determining the second access-control information comprises determining a version of the second object of the plurality of versions of the second object; determining, based on the version of the second object, a version of the second access-control information of the plurality of versions of the second access-control information; and selecting the second access-control information from the version of the second access-control information.

7. The method of claim 1, wherein the first object is referenced by the second object and comprises the content of the second object that identifies the first object.

8. The computer-implemented method of claim 1, wherein the first object is media content and the second object is a media container, and the user accesses the first object via a link provided in the second object, and the second access-control object is generated when the user attempts to share the media content via the media container.

9. The computer-implemented method of claim 1, wherein the first access-control object comprises a list of the one or more access types defined for the first object, policy information, and metadata, and the first access-control list that includes a list of users, wherein the first access-control object contains a pointer to the first access-control list, for the one or more access types defined for the first object.

10. The computer-implemented method of claim 1, wherein the second access-control object comprises a list of the one or more access types defined for the second object, policy information, and metadata, and the second access-control list that includes a list of users, wherein the second access-control object contains a pointer to the second access-control list, for the one or more access types defined for the second object.

11. The computer-implemented method of claim 10, wherein the second access-control list associated with the second access-control object comprises a webpage object linked to the access-control list of the first access-control object for a content object, such that the user that receives the webpage object is provided with access to the content object based on the access-control list of the second access-control object.

12. A non-transitory computer readable medium having stored therein computer executable instructions for providing access for an online social network having one or more users that belong to an online social circle of the online social network, the instructions comprising:
    receiving a request from a user to access a first object, where first access-control information is associated with the first object by a first access-control object that defines one or more access types defined for the first object, and provides a first pointer to a first access-control list for each of the one or more access types of the first object;
    determining that the first object is referenced by a second object;
    determining second access-control information associated with the second object, by a second access-control object that defines one or more access types of the second object, and provides a second pointer to a second access-control list for each of the one or more access types defined for the second object, where the second access-control information identifies the user as having access to the second object; and
    the first access-control object generating a link from the first access-control list to the second access-control object, without changing the second access-control object, so as to provide the user with access to the first object based on the second access-control information wherein a link table including the link is checked to determine that the link is established for the second access-control object.

13. The computer readable medium of claim 12, wherein the first access-control information is stored in the first access control object associated with the first object, the second access-control information is stored in a second access control object associated with the second object, and the method further comprises creating a third access control object that includes the first access-control information and the second access-control information, with the link from the first access-control list to the second access-control object.

14. The computer readable medium of claim 12, wherein the first access-control information is stored in the first access control object associated with the first object, and the method further comprises modifying the first access control object to include the second access-control information associated with the second object.

15. The computer readable medium of claim 12, further comprising a plurality of versions of the first object and a plurality of versions of the first access-control information, wherein the determining the first access-control information comprises determining a version of the first object of the plurality of versions of the first object; determining, based on the version of the first object, a version of the first access-control information of the plurality of versions of the first access-control information; and selecting the first access-control information from the version of the first access-control information.

16. At least one computing device for providing access for an online social network having one or more users that belong to an online social circle of the online social network, the at least one computing device comprising storage and a processor configured to perform:
    receiving a request from a user to access a first object, where first access-control information is associated with the first object by a first access-control object that defines one or more access types defined for the first object, and provides a first pointer to a first access-control list for each of the one or more access types of the first object;
    determining that the first object is referenced by a second object;
    determining second access-control information associated with the second object, by a second access-control object that defines one or more access types of the second object, and provides a second pointer to a second access-control list for each of the one or more access types defined for the second object, where the second access-control information identifies the user as having access to the second object; and
    the first access-control object generating a link from the first access-control list to the second access-control object, without changing the second access-control object, so as to provide the user with access to the first object based on to the second access-control information wherein a link table including the link is checked to determine that the link is established for the second access-control object.

17. The at least one computing device of claim 16, wherein the first access-control information is stored in the first access control object associated with the first object, the second access-control information is stored in a second access control object associated with the second object, and the method further comprises creating a third access control object that includes the first access-control information and the second access-control information, with the link from the first access-control list to the second access-control object.

18. The at least one computing device of claim 16, wherein the first access-control information is stored in the first access control object associated with the first object, and the method further comprises modifying the first access control object to include the second access-control information associated with the second object.

19. The at least one computing device of claim 16, further comprising a plurality of versions of the second object and a plurality of versions of the second access-control information, wherein the determining the second access-control information comprises determining a version of the second object of the plurality of versions of the second object; determining, based on the version of the second object, a version of the second access-control information of the plurality of versions of the second access-control information; and selecting the second access-control information from the version of the second access-control information.

20. The at least one computing device of claim 16, wherein the first object is referenced by the second object and comprises the content of the second object that identifies the first object.

* * * * *